United States Patent [19]

Tom

[11] Patent Number: 4,867,960
[45] Date of Patent: Sep. 19, 1989

[54] WATER SCAVENGERS FOR HYDROCHLORIC ACID STREAMS

[75] Inventor: Glenn M. Tom, New Milford, Conn.

[73] Assignee: Hercules Incorporated, Wilmington, Del.

[21] Appl. No.: 311,433

[22] Filed: Feb. 16, 1989

Related U.S. Application Data

[63] Continuation of Ser. No. 8,683, Jan. 29, 1987, abandoned, which is a continuation-in-part of Ser. No. 841,440, Mar. 19, 1986, abandoned.

[51] Int. Cl.$^4$ ............... B01D 53/02; B01D 53/34; C01B 7/07
[52] U.S. Cl. ............... 423/488; 423/210
[58] Field of Search ............... 423/210, 488; 55/35; 502/415

[56] References Cited

U.S. PATENT DOCUMENTS

| | | | |
|---|---|---|---|
| 3,440,009 | 4/1969 | Flood et al. | 423/488 |
| 4,009,214 | 2/1977 | Sze et al. | 423/488 |
| 4,459,372 | 7/1984 | Arena | 502/439 |
| 4,564,509 | 1/1986 | Shealy et al. | 423/210.5 |
| 4,579,723 | 4/1986 | Weltmer et al. | 423/219 |
| 4,594,231 | 6/1986 | Nishino et al. | 423/210 |

FOREIGN PATENT DOCUMENTS

| | | | |
|---|---|---|---|
| 0150736 | 9/1981 | German Democratic Rep. | 423/488 |
| 0783221 | 11/1980 | U.S.S.R. | 423/488 |

OTHER PUBLICATIONS

"Reactions of Titanium Tetrachloride with Silica Gel Surfaces", Ellestad et al., Journal of Molecular Catalysis, 33, (1985), pp. 275–287.

Ghandhi, VLSI Fabrication Principles, John Wiley & Sons, 1983, pp. 248–249, 251–257.

Gas Purification, 3rd Ed., Kohl & Riesenfeld, Gulf Publishing Co., 1979, p. 580.

*Primary Examiner*—John Doll
*Assistant Examiner*—Jeffrey Edwin Russel
*Attorney, Agent, or Firm*—Joanne W. Patterson

[57] ABSTRACT

The water content of an HCl gas stream is reduced to less than 1 ppm by contacting the gas stream with a chloride of silicon or a chloride of a metal having a valence of at least four that is immobilized on a solid support.

2 Claims, No Drawings

WATER SCAVENGERS FOR HYDROCHLORIC ACID STREAMS

This application is a continuation of application Ser. No. 07/008,683 filed Jan. 29, 1987, now abandoned. Ser. No. 07/008,683 is a continuation-in-part of Ser. No. 06/841,440 filed Mar. 19, 1986, now abandoned.

FIELD OF THE INVENTION

This invention relates to a process for the removal of trace amounts of water from gaseous hydrochloric acid. This invention especially relates to the use of certain chlorides as scavengers to reduce the water content of HCl gas streams to less than one part per million (ppm).

SUMMARY OF THE INVENTION

The process of this invention for reducing the water content of HCl gas streams to less than one part per million comprises contacting the HCl gas stream with a chloride of silicon or a chloride of a metal having a valence of at least four. The chloride is preferably immobilized on a solid support.

DETAILED DESCRIPTION OF THE INVENTION

Ordinarily it is difficult to remove trace amounts of water from HCl, since HCl is more reactive than water and is hygroscopic. However, silicon and certain high valency metals react more easily with oxide ligands than with chloride ligands. Such metals include, for example, Ti, Zr and W. Typical reactions include the following:

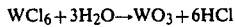  (1)

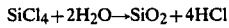  (2)

Other suitable chlorides include, but are not limited to, $TiCl_4$ and $ZrCl_4$.

In some applications it will be advantageous to use the scavengers of this invention at a low temperature that is above the boiling point of HCl. The equilibrium constants will be larger for the removal of water if the temperature is low. This effect is important for scavengers having a low equilibrium constant at room temperature, e.g., $WCl_6$. Another effect of low temperature is the lowering of the vapor pressure of liquid scavengers such as $SiCl_4$ and $TiCl_4$, which have a high vapor pressure at room temperature. The high vapor pressure may lead to the emission of metal or silicon compounds into the purified HCl stream.

Solid scavengers such as $WCl_6$ and $ZrCl_4$ can be adsorbed on a solid support such as a macroreticulate styrene-divinylbenzene polymer to increase the surface area of the scavenger.

The vapor pressure of liquid chloride scavengers may be decreased without lowering the temperature below room temperature by immobilizing the chloride on a solid support having free —OH groups or OM' groups on its surface, where M' is an alkali or alkaline earth metal. Such supports include high surface area inorganic supports such as alumina and silica. Polymers containing a functional group that is reactive with the chloride, e.g., polyvinyl alcohol, may also be used as the support. The immobilization takes place according to the following reaction, using $SiCl_4$ as an example:

$$SiCl_4 + HOMO_3 \rightarrow Cl_3SiOMO_3 + HCl \quad (3)$$

where $HOMO_3$ represents a metal oxide or hydroxide surface. $SiCl_4$ immobilized on alumina is the preferred scavenger. The liquid chloride scavengers can be reacted with the solid support directly, or they can be heated to vaporize them before contact with the support. If the support is treated with a gaseous chloride, the support with the immobilized chloride on its surface should subsequently be treated with hot HCl gas to drive off any loosely bound chloride.

For applications in which the emission of metal or silicon compounds into the purified HCl stream would be detrimental, it is advisable to heat the alumina with the immobilized chloride on its surface to a temperature of about 190° C. for 17 hours under nitrogen before contact with the HCl stream. This heat treatment will drive off any weakly bound metal or silicon chlorides. The capacity of the chloride-alumina scavenger is typically about 2 liters of water vapor per liter of bed. The purified gas stream can subsequently be passed through a post-trap containing activated alumina to remove any remaining traces of silicon or metal compounds. For example, after passing through a heat-treated $SiCl_4/Al_2O_3$ scavenger and an activated alumina post-trap, the level of silicon in the purified HCl stream is typically less than 0.05 ppm (measured by atomic adsorption after passing the HCl stream through 100 ml water). The alumina used in the post-trap is preferably heated in a stream of nitrogen at about 190° C. for 17 hours and cooled before use.

The water content of the purified gas stream is less than one ppm, and preferably less than 0.5 ppm.

The removal of moisture from an HCl gas stream to minimize oxidation reactions is important in the semiconductor industry. For example, moisture-free HCl is needed for cleaning ovens used in the manufacture of semiconductor wafers to prevent subsequent contamination of wafers, and for the etching of silicon wafers to prevent the formation of oxides on the surface of the wafers. Anhydrous gaseous HCl is used for the conversion of ferrosilicon (FeSi) to $HSiCl_3$, which in turn is used for the manufacture of silicon wafers. The prevention of corrosion of tubing used for transporting HCl is also an important consideration.

EXAMPLE 1

Acidic $Al_2O_3$ (Woelm ® A, Akt.l, manufactured by Woelm Pharma GmbH & Co.) is packed into a stainless steel 150 ml sample cylinder. The alumina is dried under a stream of $N_2$ at 200° C. for 10 hours.

A silicon tetrachloride-functionalized $Al_2O_3$ scavenger is prepared as follows. The bed of dried $Al_2O_3$ is flooded with a 30 volume percent solution of $SiCl_4$ in hexane and the $SiCl_4$ is left in contact with the bed for at least one hour. The bed is then washed with four bed volumes of sparged hexane. The sample is dried at 65° C. under a stream of $N_2$ to drive off the hexane. The functionalized alumina is then held at 190° C. for 17 hours to drive off volatile components.

An aliquot of the heat-treated scavenger is placed in a 4" polymerization tube. $N_2$ is passed through the sample. No acidity is detected with tricolor pH paper. $N_2$ is then bubbled through water in a 4" polymerization tube and the water-laden gas is passed through the scavenger. The off-gas becomes acidic, indicating that the $SiCl_4$ is capable of removing moisture from the gas stream according to equation (2).

EXAMPLE 2

A silicon tetrachloride-functionalized $Al_2O_3$ scavenger is prepared and tested as described in Example 1, except that when the dried alumina is flooded with neat $SiCl_4$ rather than a solution of $SiCl_4$ in hexane. The reaction mixture is allowed to stand for at least one hour before heating to drive off volatile components.

EXAMPLE 3

Acidic alumina is packed into a one-gallon stainless steel reactor. The alumina is dried overnight under a stream of $N_2$ at 190° C.

A silicon tetrachloride-functionalized alumina scavenger is prepared as follows. Silicon tetrachloride (250 ml) is transferred via a cannula into a bubbler heated to a temperature of 57° C. Nitrogen is passed through the heated $SiCl_4$ until all of the $SiCl_4$ has evaporated and has passed through the alumina in the reactor. HCl gas that has been heated by passing through a preheating coil is then passed through the $SiCl_4$-functionalized alumina for five hours to drive off any loosely bound $SiCl_4$. The scavenger is then held at a temperature of 190° C. under a stream of nitrogen for at least eight hours to remove excess HCl.

EXAMPLE 4

The capacity of $SiCl_4$-functionalized alumina scavengers to remove water from a gas stream is measured by the following procedure. $N_2$ is bubbled through water held at 24° C. The vapor pressure of water at this temperature is 24 mm Hg. The wet $N_2$ is passed at a rate of 200 ml per minute through a 30 ml sample of the scavenger in a polymerization tube. The off-gas from the tube containing the scavenger is passed through 200 ml of water. The gas is fed through a Teflon tube since a stainless steel line produces grounding problems with the pH electrode. The $H^+$ concentration of the water is measured with a pH meter as a function of time. The flow rate of the wet $N_2$ is 0.302 standard liters per minute. Knowing the volume of the water trap, the volume of the bed and the final proton concentration of the water trap, the capacity of the bed can be calculated. The capacities of the various forms of the $SiCl_4/Al_2O_3$ scavengers are as follows:

| Scavenger | Capacity (liters $H_2O$ vapor/liter of bed) |
| --- | --- |
| $SiCl_4$ in hexane | 1.95 |
| $SiCl_4$ in hexane, heat treated | 2.6 |
| Neat $SiCl_4$ | 5.5 |
| Neat $SiCl_4$, heat treated | 2 |

EXAMPLE 5

A stream of dry HCl gas is mixed with nitrogen containing a known amount of moisture so that the HCl stream contains 5 ppm water. The HCl stream is then passed under one atmosphere pressure through a 500 ml column containing the heat-treated $SiCl_4/Al_2O_3$ scavenger prepared as described in Example 1. The flow rate of the HCl gas through the column is 160 volumes of gas per volume of bed per hour and the process is carried out at room temperature. The moisture level of the exit gas is measured at ½ hour intervals for a two hour period. This procedure is repeated using HCl gas streams containing 13 and 37 ppm water. The procedure is again repeated using a gas stream containing 20 ppm water, except that the flow rate is increased to 760 volumes of HCl per volume of bed per hour. In each case the moisture content of the HCl stream at the end of the two hour period is less than 0.1 ppm. The moisture content of the HCl stream was measured as described in Flaherty et al., Anal. Chem. 1986, 58, 1903-1904.

EXAMPLE 6

Macroreticulate styrene/divinylbenzene (PSDVB) polymer (Amberlite XAD4, manufactured by Rohm and Haas) is washed with water and the fines are removed by decantation. The polymer is washed in turn with 3 bed volumes of water, methanol, isopropyl alcohol and hexane. Air is passed through the bed for about two hours to remove the bulk of the solvents. The air-dried resin is packed into a stainless steel reactor and dried under a stream of nitrogen at 110° C. for 10–12 hours.

A supported $WCl_6$ scavenger is prepared as follows.

The dried PSDVB (25 g) is mixed with $WCl_6$ (2.52 g) in 50 ml sparged toluene. A nitrogen stream is passed through the mixture at 110° C. overnight to remove toluene.

PSDVB having $WCl_6$ adsorbed on its surface is transferred to a buret for testing. Dry nitrogen is passed through the PSDVB-$WCl_6$ scavenger. No acidity is detected with tricolor pH paper. $N_2$ is then bubbled through water in a 4" polymerization tube and the water-laden gas is passed through the scavenger. The off-gas becomes acidic, indicating that the $WCl_6$ is capable of removing moisture from the gas stream according to equation (1).

What I claim and desire to protect by Letters Patent is:

1. In a process for reducing the water content of an HCl gas stream, the improvement comprising reducing the water content to less than 1 ppm by contacting the gas stream with a chloride of silicon or a chloride of a metal having a valence of at least four that is immobilized on a solid support.

2. The process of claim 1 wherein the chloride of silicon is $SiCl_4$ and the support is alumina.

* * * * *